United States Patent
Kojima et al.

(10) Patent No.: US 11,485,243 B2
(45) Date of Patent: Nov. 1, 2022

(54) VEHICLE AND CHARGING SYSTEM

(71) Applicant: TOYOTA JIDOSHA KABUSHIKI KAISHA, Toyota (JP)

(72) Inventors: Koichi Kojima, Toyota (JP); Takahiko Mase, Handa (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/125,094

(22) Filed: Dec. 17, 2020

(65) Prior Publication Data
US 2021/0268923 A1 Sep. 2, 2021

(30) Foreign Application Priority Data
Feb. 28, 2020 (JP) .............................. JP2020-033528

(51) Int. Cl.
*B60L 53/16* (2019.01)
*H02J 7/00* (2006.01)
*B60L 53/60* (2019.01)

(52) U.S. Cl.
CPC ............... *B60L 53/16* (2019.02); *B60L 53/60* (2019.02); *H02J 7/0045* (2013.01)

(58) Field of Classification Search
CPC .......... B60L 53/16; B60L 53/60; H02J 7/0045
USPC ........................................................ 320/109
See application file for complete search history.

(56) References Cited

U.S. PATENT DOCUMENTS

| | | | |
|---|---|---|---|
| 2012/0135626 A1* | 5/2012 | Tormey ................. | B60L 3/0069 320/109 |
| 2014/0002018 A1* | 1/2014 | Montemayor Cavazos ................ | B60L 53/31 320/109 |
| 2014/0232338 A1* | 8/2014 | Fontana .................. | B60L 58/12 320/109 |
| 2016/0129800 A1* | 5/2016 | Mauter ................... | B60L 53/62 320/109 |
| 2019/0061538 A1 | 2/2019 | Kinomura | |
| 2019/0210468 A1* | 7/2019 | Wittl ....................... | B60L 53/31 |
| 2019/0378365 A1* | 12/2019 | Jordan, III ............. | B60L 53/60 |

FOREIGN PATENT DOCUMENTS

| | | | | |
|---|---|---|---|---|
| CN | 106114248 A | * | 11/2016 | |
| CN | 104417387 B | * | 6/2018 | ............... B60L 3/00 |
| EP | 2439099 A2 | * | 4/2012 | ............. B60L 53/60 |
| EP | 2842793 A1 | * | 3/2015 | ............. B60L 3/00 |
| EP | 3512052 A1 | * | 7/2019 | .......... B60L 11/1818 |
| EP | 3747688 A1 | * | 12/2020 | ............. B60L 53/14 |
| JP | 2019-047544 A | | 3/2019 | |
| WO | WO-2021069175 A1 | * | 4/2021 | |

* cited by examiner

*Primary Examiner* — Suresh Memula
(74) *Attorney, Agent, or Firm* — Oliff PLC

(57) ABSTRACT

The vehicle includes an inlet configured to be connected to a charging connector provided in a charging station, a lock device configured to switch between a locked state where the charging connector is locked to the inlet and an unlocked state where the charging connector is removable from the inlet, a power storage device configured to be charged with an electric power supplied through the charging connector, and a control device configured to control charging of the power storage device. In a state where the charging connector is connected to the inlet and the power storage device is being charged, the control device stops charging when the lock device is in the unlocked state.

8 Claims, 13 Drawing Sheets

FIG. 2
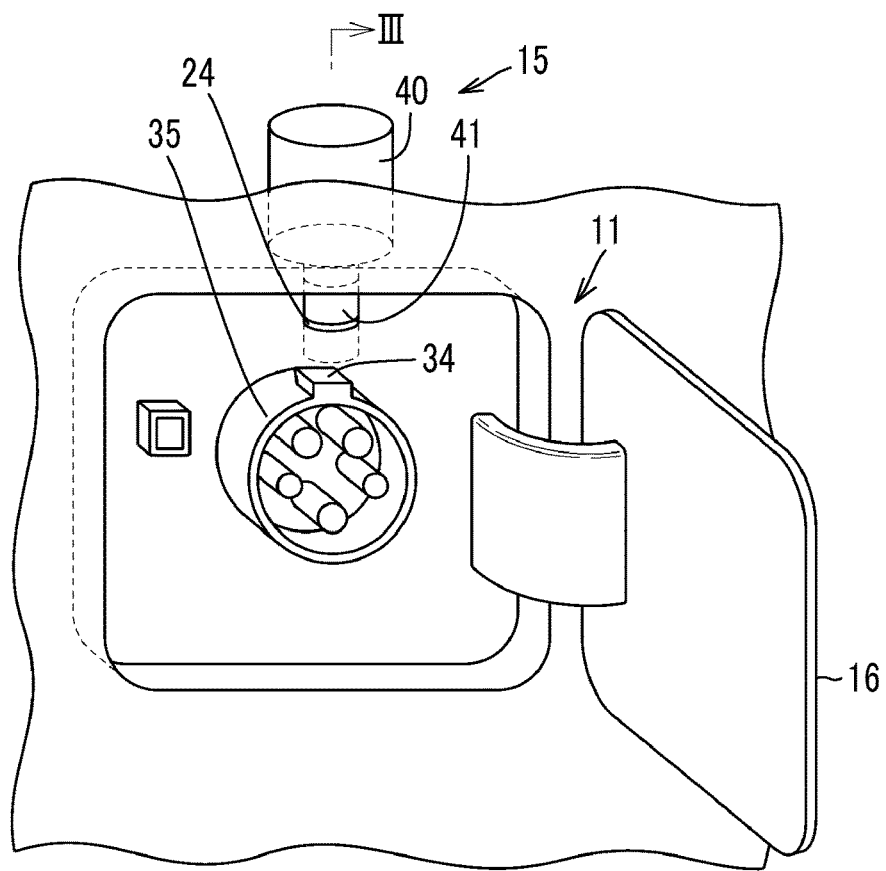
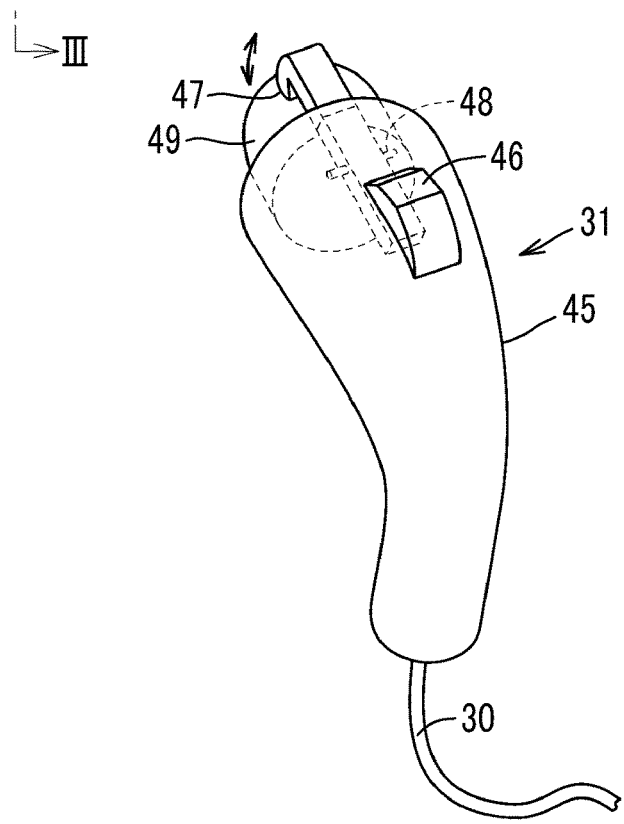

VEHICLE AND CHARGING SYSTEM

CROSS-REFERENCE TO RELATED APPLICATION

This application claims priority to Japanese Patent Application No. 2020-033528 filed on Feb. 28, 2020, incorporated herein by reference in its entirety.

BACKGROUND

1. Technical Field

The present disclosure relates to a vehicle and a charging system.

2. Description of Related Art

Conventionally, various vehicles that can charge a power storage device with an electric power supplied from a charging station have been proposed.

For example, a vehicle described in Japanese Unexamined Patent Application Publication No. 2019-47544 (JP 2009-47544 A) includes an inlet to which a charging connector of a charging station is connected, a lock device that locks the charging connector to the inlet, and a power storage device.

In a state where the charging connector is connected to the inlet and the power storage device is being charged, the vehicle requests the charging station to supply a current having a first current value when the charging connector is locked to the inlet.

In a state where the charging connector is connected to the inlet and the power storage device is being charged, the vehicle requests the charging station to supply a current having a second current value when the charging connector is in an unlocked state where the charging connector is not locked to the inlet. The second current value is smaller than the first current value.

SUMMARY

When the unlocked state is detected, the vehicle reduces the required current value to the charging station.

The charging station controls the output power supplied to the vehicle by feedback control. Here, an output current (output power) may hunt, overshoot, or undershoot in a case where the output power is changed drastically when the required current value (required power value) from the vehicle is changed.

A follow-up time required to make the output power output from the charging station follow the required current value (required power value) from the vehicle is long.

As a result, it takes a predetermined time for the charging station to change a current value of the output current from the first current value to the second current value when the vehicle detects the unlocked state during charging.

On the other hand, when the charging connector is in the unlocked state, the charging connector may be pulled out, such that there is a need to reduce the current output from the charging station in a short time.

The present disclosure has been made in a view of the problems, and an object thereof is to provide a vehicle and a charging system that can reduce an output current in a short time when it is detected that a charging connector is in an unlocked state during charging.

A first aspect of the present disclosure relates to a vehicle including an inlet configured to be connected to a charging connector provided in a charging station, a lock device configured to switch between a locked state where the charging connector is locked to the inlet and an unlocked state where the charging connector is removable from the inlet, a power storage device configured to be charged with an electric power supplied through the charging connector, and a control device configured to control charging of the power storage device. In a state where the charging connector is connected to the inlet and the power storage device is being charged, the control device stops charging when the lock device is in the unlocked state.

The vehicle according to the first aspect may further include a charger configured to receive an input power supplied through the charging connector and output an output power to the power storage device by adjusting the received input power. The charger may perform feedback control of the output power such that the output power approaches a required power received from the control device. The charger may not perform the feedback control when charging is stopped.

The vehicle according to the first aspect may further include a charger configured to receive an input power supplied through the charging connector and output an output power to the power storage device by adjusting the received input power. The charger may be driven such that the output power becomes a required power received from the control device. A rate of change at which the charger changes the output power when the control device stops charging may be higher than a rate of change at which the charger changes the output power such that the output power becomes the required power.

In the vehicle according to the first aspect, the control device may stop charging when the lock device is in the unlocked state, and restart charging of the power storage device after a predetermined period has elapsed from stop of charging.

In the vehicle according to the first aspect, a first charging power when charging of the power storage device is restarted may be smaller than a second charging power before charging of the power storage device is stopped.

A second aspect of the present disclosure relates to a charging system including a charging station provided with a charging connector and a vehicle. The vehicle includes an inlet to which the charging connector is connected, a cable lock device configured to switch between a locked state where the charging connector connected to the inlet is locked to the inlet and an unlocked state where the charging connector connected to the inlet is removable from the inlet, a power storage device configured to be charged with an electric power supplied through the charging connector, and a control device configured to control charging of the power storage device. In a state where the charging connector is connected to the inlet and the power storage device is being charged, the control device stops charging when the cable lock device is in the unlocked state.

With the vehicle and the charging system according to the present disclosure, the output current can be reduced in a short time when it is detected that the charging connector is in the unlocked state during charging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a perspective view schematically showing an inlet 11 and a charging connector 31;

DETAILED DESCRIPTION OF EMBODIMENTS

A vehicle 2 and a charging system 1 according to the present embodiment will be described with reference to FIGS. 1 to 13. In configurations shown in FIGS. 1 to 13, the same or substantially the same configurations are assigned with the same reference signs, and redundant description will be omitted.

First Embodiment

Figure 1:
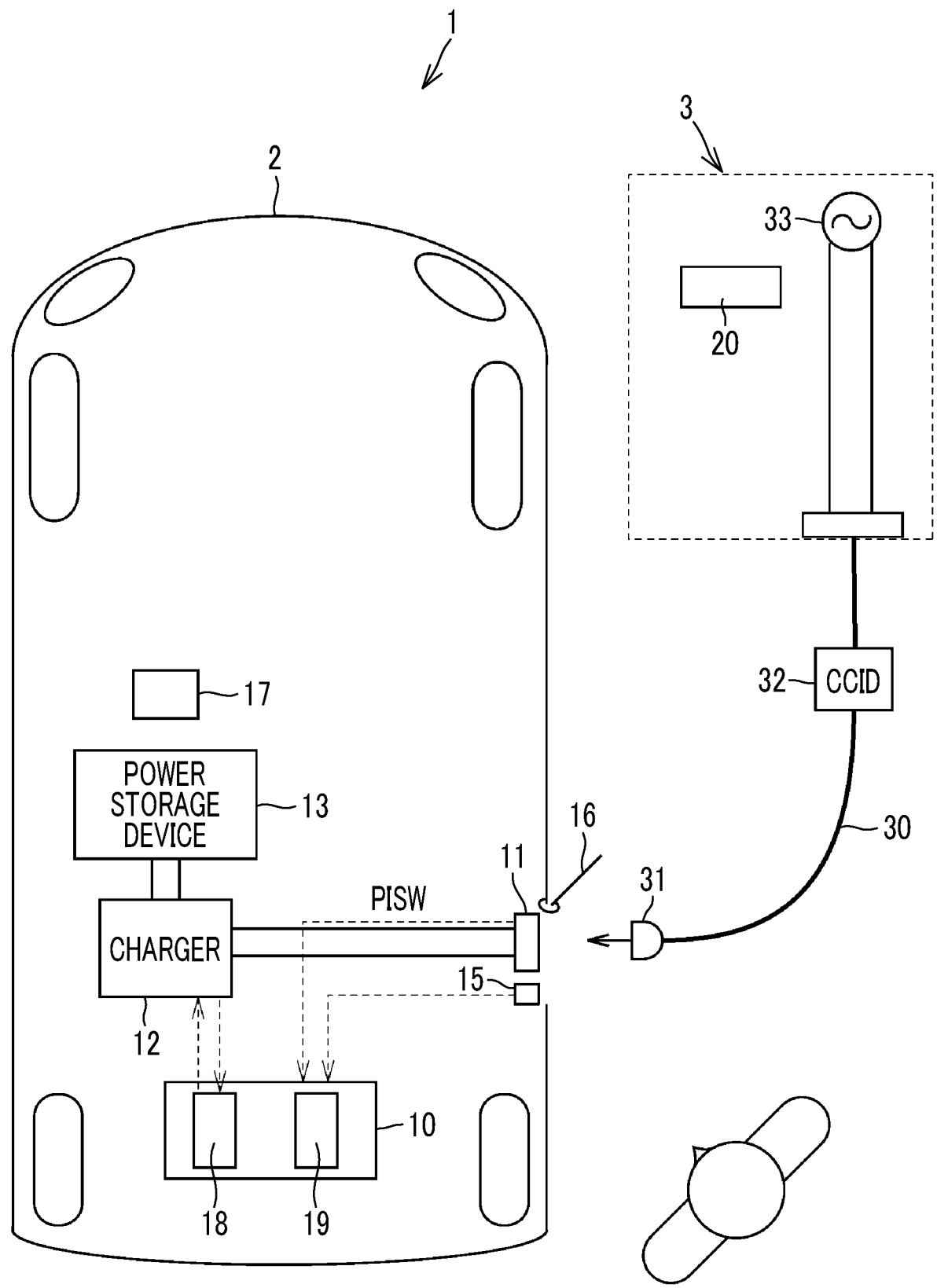
FIG. 1 is a block diagram schematically showing a charging system 1 according to a first embodiment.

FIG. 1 is a block diagram schematically showing a charging system 1 according to a first embodiment. The charging system 1 includes a vehicle 2 and a charging station 3. The vehicle 2 includes a controller 10, an inlet 11, a charger 12, a power storage device 13, a lock device 15, and a battery electronic control unit (ECU) 17.

The inlet 11 is a connection portion to which a charging connector 31 provided in the charging station 3 is connected. Note that, the vehicle 2 is provided with a lid 16, and by opening the lid 16, the inlet 11 is exposed to the outside and the charging connector 31 can be connected.

The charger 12 is, for example, a converter such as an AC to DC converter. The charger 12 converts an alternating current power supplied through the inlet 11 into a direct current power and supplies the direct current power to the power storage device 13.

The power storage device 13 is a secondary battery such as a lithium-ion battery or a capacitor. The power storage device 13 supplies an electric power to a drive inverter (not shown) or the like, and the drive inverter converts the direct current power supplied from the power storage device 13 into an alternating current power and supplies the alternating current power to a drive motor. The drive motor generates a driving force that drives drive wheels.

The controller 10 is an electronic control unit (ECU) that controls driving of the charger 12 or the like. The controller 10 includes a controller 18 and a controller 19. The vehicle 2 and the charging station 3 can communicate with each other through a charging cable 30 and the charging connector 31 in a state where the charging connector 31 is connected to the inlet 11. Therefore, the controller 10 can give and receive various information to and from the charging station 3 through the charging cable 30 and the charging connector 31.

The charging station 3 includes a control device 20, the charging cable 30, the charging connector 31, a Charging Circuit Interrupt Device (CCID) 32, and a power supply unit 33. The CCID 32 is a device that switches electrical connection between the inlet 11 and the power supply unit 33.

The CCID 32 includes a control pilot circuit and a relay (not shown).

The control pilot circuit includes an oscillation circuit and oscillates a pilot signal CPLT having a pulse width (duty cycle) when the charging connector 31 is connected to the inlet 11. The current capacity that can be supplied is notified to a plug-in hybrid vehicle by the pulse width of the pilot signal CPLT.

The relay provided in the CCID 32 is turned on when the charging connector 31 is connected to the inlet 11, and a connector signal PISW indicating that the charging connector 31 is connected to the inlet 11 is input to the controller 10.

FIG. 2 is a perspective view schematically showing the inlet 11 and the charging connector 31. The inlet 11 includes a tubular portion 35 formed in a tubular shape, a plurality of power terminals, earth terminals, and communication terminals housed in the tubular portion 35. An engagement portion 34 is formed on an outer peripheral surface of the tubular portion 35. The lock device 15 is disposed above the tubular portion 35. The lock device 15 includes a drive unit 40, a pressing pin 41, and a pressing force detection sensor 42.

The drive unit 40 moves the pressing pin 41 in a vertical direction. The pressing force detection sensor 42 is provided at a bottom end portion of the pressing pin 41.

The charging connector 31 includes a housing 45, an operation switch 46, a hook 47, a pin 48, and a tubular portion 49. The housing 45 is formed such that a charging operator can hold it. The operation switch 46 is provided on an upper surface of the housing 45, and the hook 47 and the tubular portion 49 are provided at a tip portion of the housing 45.

The tubular portion 49 is formed in a tubular shape, and is formed to fit with the tubular portion 35. A plurality of power terminals, earth terminals, and communication terminals are provided in the tubular portion 49. The power terminals, the earth terminals, and the communication terminals are connected to each other, respectively, by fitting the tubular portion 49 into the tubular portion 35.

When the tubular portion 49 is fitted into the tubular portion 35, the hook 47 engages with the engagement portion 34. As a result, the charging connector 31 is connected to the inlet 11.

In addition, when the operation switch 46 is pushed, the engaged state of the hook 47 and the engagement portion 34 is released. By pushing the operation switch 46, the hook 47 rotates around the pin 48, and the hook 47 moves upward. As a result, the engaged state of the hook 47 and the engagement portion 34 is released.

Figure 3:
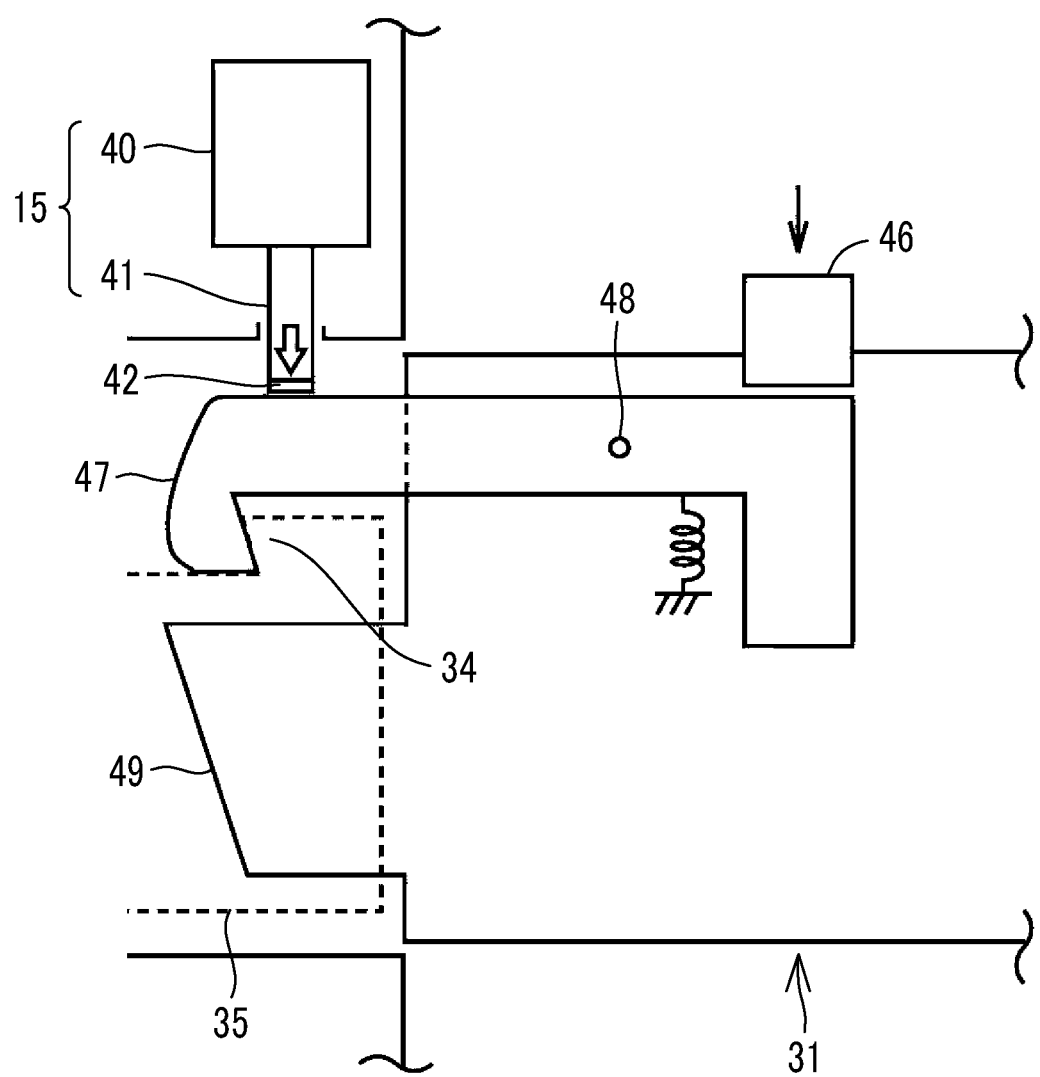
FIG. 3 is a cross-sectional view schematically showing a state where a lock device 15 locks the charging connector 31 to the inlet 11.

FIG. 3 is a cross-sectional view schematically showing a state where the lock device 15 locks the charging connector 31 to the inlet 11.

When the charging connector 31 is connected to the inlet 11, the controller 10 acquires the connector signal PISW from the CCID 32, and the controller 10 detects that the charging connector 31 is connected.

After the controller 10 receives the connector signal PISW, the controller 10 drives the drive unit 40 to move the pressing pin 41 downward before charging is started. When the pressing pin 41 moves downward in a state where the charging connector 31 is connected to the inlet 11, the pressing pin 41 presses the hook 47. As a result, the engaged state of the hook 47 and the engagement portion 34 is maintained even though the operation switch 46 is operated.

The pressing force detection sensor 42 is provided at the bottom end portion of the pressing pin 41, and the pressing force detection sensor 42 also contacts the hook 47 when the pressing pin 41 presses the hook 47. When the pressing force detection sensor 42 contacts the hook 47, the pressing force detection sensor 42 transmits a contact signal "ON" to the controller 19. When the controller 19 receives the contact signal from the pressing force detection sensor 42, the controller 19 determines that the charging connector 31 is in a locked state.

Figure 4:
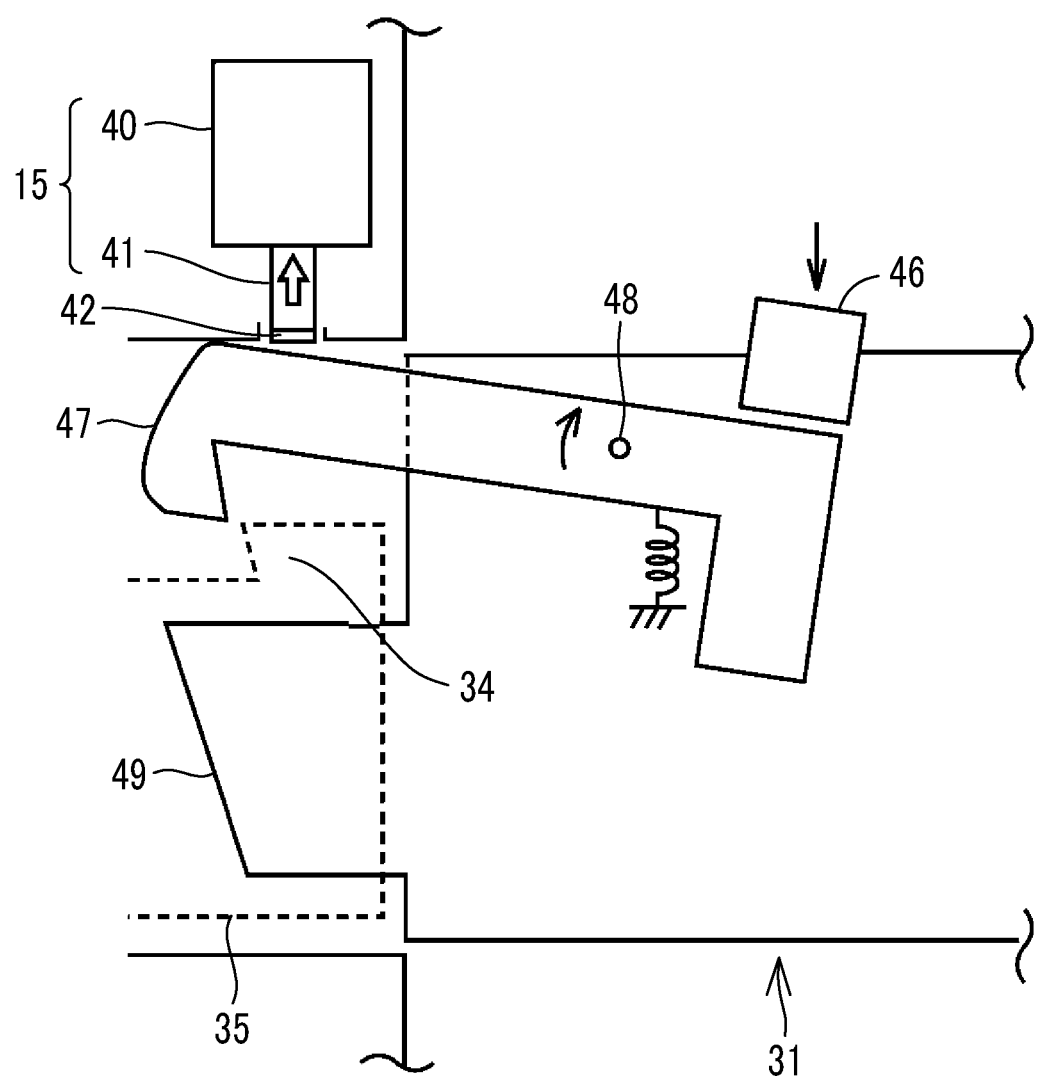
FIG. 4 is a side-sectional view showing that the charging connector 31 and the inlet 11 are in an unlocked state.

FIG. 4 is a side-sectional view showing that the charging connector 31 and the inlet 11 are in an unlocked state. For example, when charging of the power storage device 13 is completed, the controller 10 drives the drive unit 40 to move the pressing pin 41 upward. In this manner, the engaged state of the hook 47 and the engagement portion 34 can be released by operating the operation switch 46. The pressing force detection sensor 42 separates from the hook 47 as the pressing pin 41 moves upward. When the pressing force detection sensor 42 separates from the hook 47, the pressing force detection sensor 42 transmits a contact signal "OFF" to the controller 19. When the controller 19 receives the connector signal PISW and receives the contact signal "OFF" from the pressing force detection sensor 42, the controller 19 determines that the charging connector 31 is in the unlocked state. On the other hand, when the connector signal PISW is no longer received, the controller 19 determines that the charging connector 31 is not connected.

Figure 5:
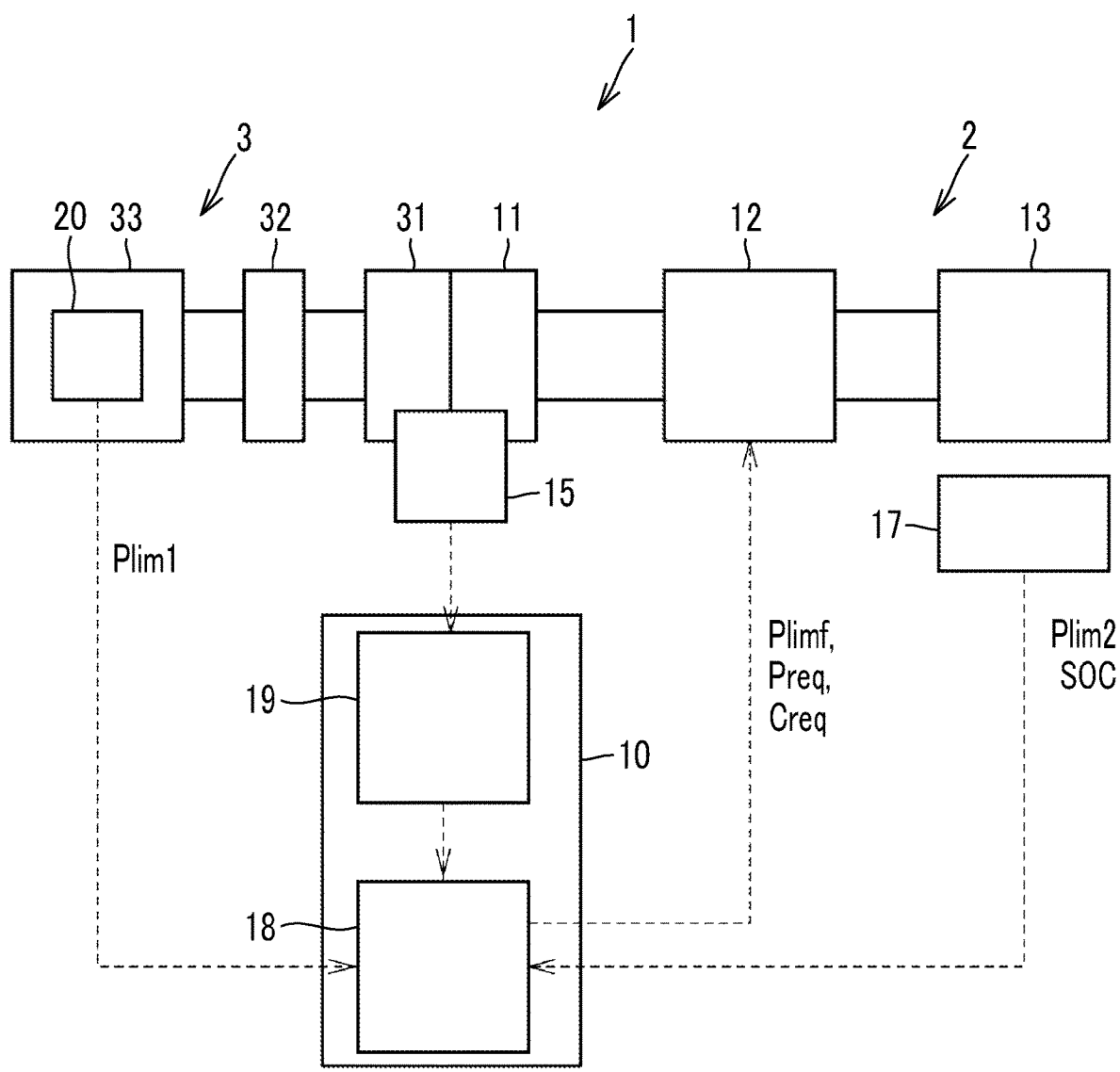
FIG. 5 is a block diagram schematically showing the charging system 1.
Figure 6:
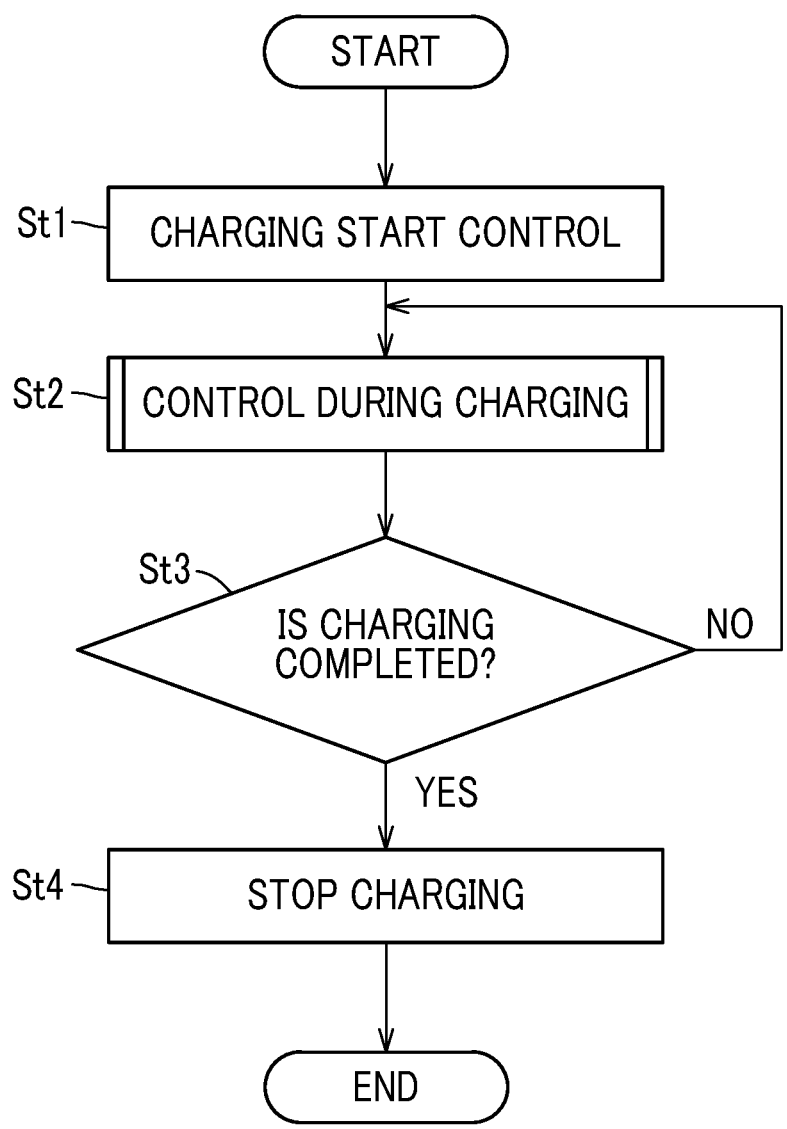
FIG. 6 is a flowchart showing a flow from start of charging to completion of charging.

FIG. 5 is a block diagram schematically showing the charging system 1. FIG. 6 is a flowchart showing a flow from start of charging to completion of charging. As shown in FIG. 6, the flow from the start of charging to the end of charging of the charging system 1 includes a charging start control (Step St1), a control during charging (Step St2), and a step of determining whether charging is completed (Step St3), and a step of stopping charging (Step St4). In addition, in FIG. 6 or the like, "St" indicates "Step".

The charging start control will be described with reference to FIG. 5. The controller 10 includes a controller 18 and a controller 19. The controller 19 acquires a rated current of the charging cable 30 from the pulse width of the pilot signal CPLT. The controller 19 detects that the charging connector 31 is connected to the inlet 11 based on the connector signal PISW from the CCID 32. The controller 19 acquires a state signal indicating the locked state or the unlocked state from the lock device 15. Then, the controller 19 transmits information showing the rated current of the charging cable 30, a connection state of the charging connector 31, and the locked state of the charging connector 31 to the controller 18.

When the charging connector 31 is connected to the inlet 11, the controller 18 establishes communication with the control device 20 of the charging station 3 and gives and receives various information to and from the control device 20.

For example, in a case where the power supply unit 33 is a household power supply, the control device 20 sets an input upper limit power value Plim1 based on a required power from other electric appliances provided in the house or the like. The input upper limit power value Plim1 is an upper limit value of the electric power supplied from the power supply unit 33 to the vehicle 2. The input upper limit power value Plim1 is transmitted to the controller 18.

The battery ECU 17 acquires a temperature of the power storage device 13 from a temperature sensor provided in the power storage device 13. Furthermore, the battery ECU 17 calculates an SOC of the power storage device 13 from information such as an amount of current input to and output from the power storage device 13 and the temperature. Further, the battery ECU 17 calculates an upper limit power value Plim2 that can charge the power storage device 13 based on the SOC and the temperature of the power storage device 13. The upper limit power value Plim2 is, for example, an upper limit value for preventing the power storage device 13 from exceeding a predetermined threshold temperature during charging.

Then, the battery ECU 17 transmits information showing the SOC of the power storage device 13 and the upper limit power value Plim2 to the controller 18.

The controller 18 sets the smaller one of the input upper limit power value Plim1 and the upper limit power value Plim2 as an upper limit power value Plimf.

The controller 18 calculates a required power Preq based on the current SOC of the power storage device 13, the upper limit power value Plimf, the rated current of the charging cable 30, or the like.

The controller 18 turns on the CCID 32 when the charging connector 31 is connected to the inlet 11 and the charging connector 31 is in the locked state.

The controller 18 transmits a charging request Creq of "ON" to the charger 12, and further transmits the required power Preq and the upper limit power value Plimf.

When the charger 12 receives the charging request Creq of "ON", the charger 12 is activated. Then, the charger 12 supplies the electric power to the power storage device 13 based on the required power Preq and the upper limit power value Plimf received from the controller 18. Specifically, an output power Pout is controlled not to exceed the upper limit power value Plimf while the output power Pout output from the charger 12 to the power storage device 13 is controlled to be the required power Preq.

Figure 7:
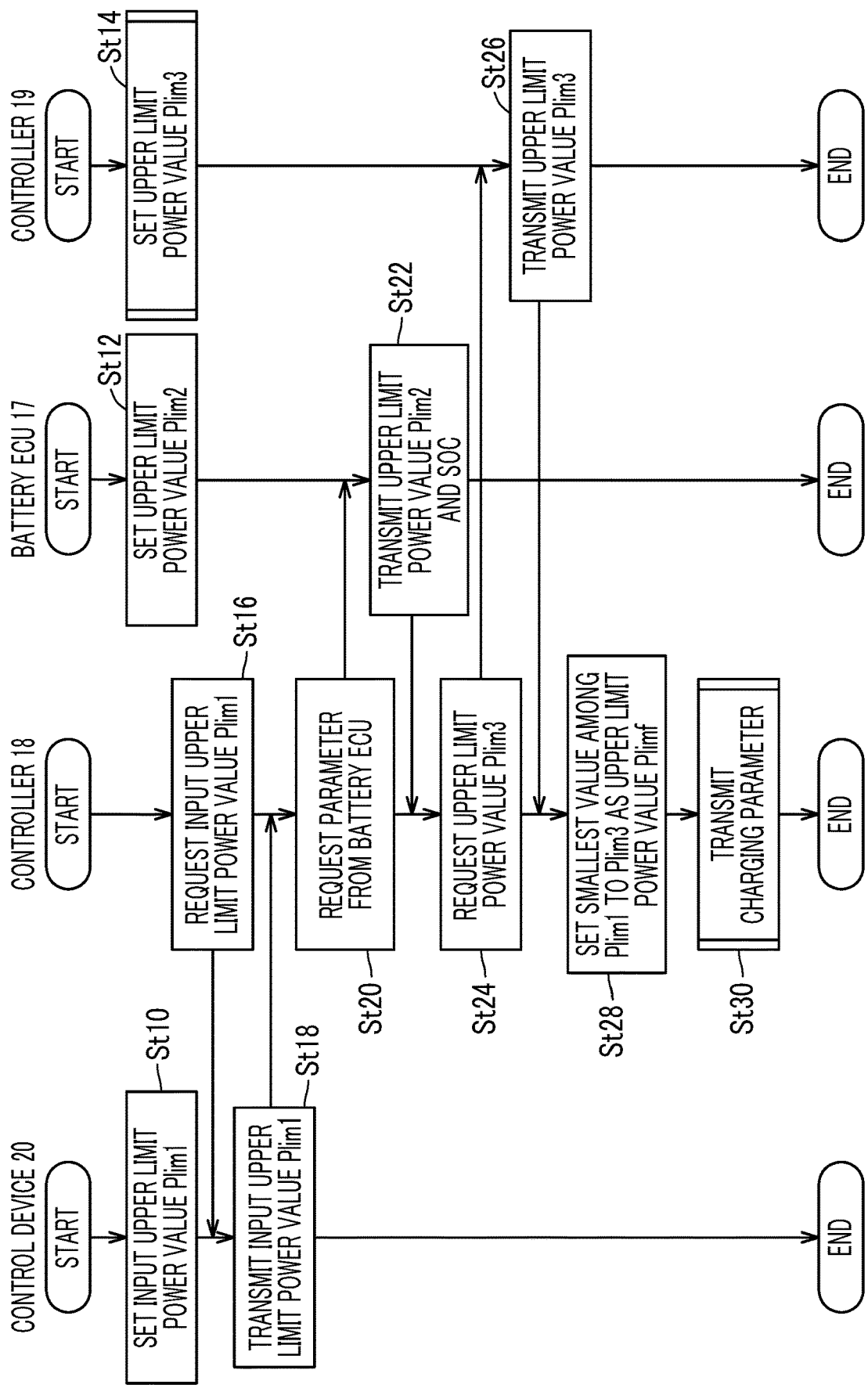
FIG. 7 is a flowchart showing a charging control flow after start of charging.

Next, a charging control flow after the start of charging will be described with reference to FIG. 7. FIG. 7 is a flowchart showing the charging control flow after the start of charging.

The control device 20 sets the input upper limit power value Plim1 (Step St10). For example, when the required power from the home electric appliance increases, the input upper limit power value Plim1 is set to be small.

The battery ECU 17 sets the upper limit power value Plim2 based on the current SOC acquired from the power storage device 13 and the temperature of the power storage device 13, or the like. For example, when the temperature of the power storage device 13 is higher than the predetermined threshold temperature, a small upper limit power value Plim2 is set (Step St12).

Figure 8:
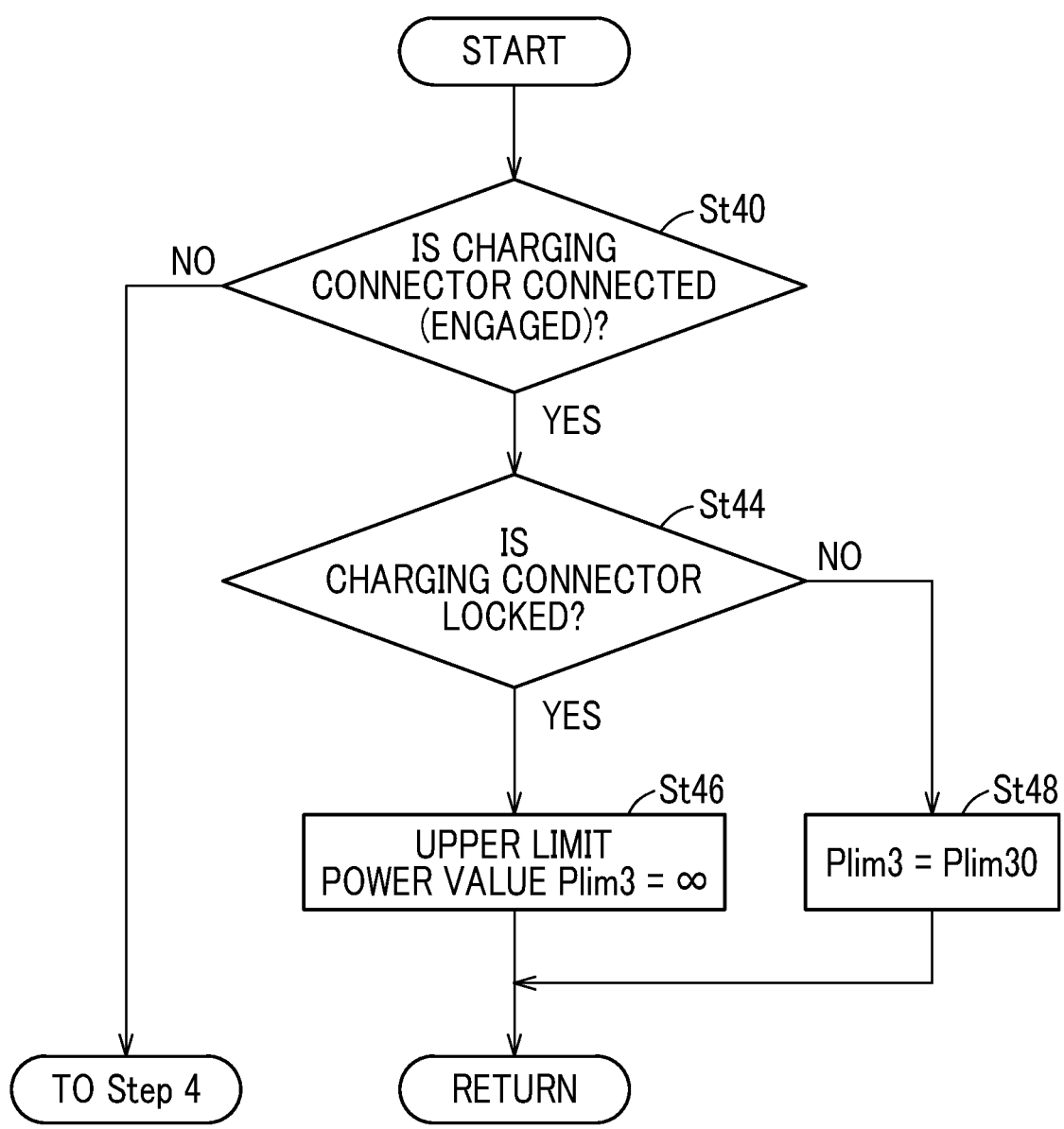
FIG. 8 is a flowchart showing a flow for setting an upper limit power value Plim3.

The controller 19 sets an upper limit power value Plim3 (Step St14). FIG. 8 is a flowchart showing a flow for setting the upper limit power value Plim3.

The controller 19 determines whether or not the charging connector 31 is connected to the inlet 11 (Step St40). Specifically, the controller 19 determines whether or not the charging connector 31 is connected to the inlet 11 based on the connector signal PISW from the CCID 32.

When the controller 19 determines that the charging connector 31 is not connected (No in Step St40), the process proceeds to Step St4 shown in FIG. 6 and stops charging (Step St4). Specifically, the controller 19 stops driving the charger 12. Further, when a charging relay is provided between the charger 12 and the power storage device 13, the charging relay is turned off. In such a case, it is highly possible that the charging connector 31 was pulled out during charging. At this time, since a voltage of the power storage device 13 is applied to power terminals 36, 37 of the inlet 11, the controller 19 immediately turns off the charging relay. Further, the charger 12 is turned off such that the electrical connection between the power terminals 36, 37 and the power storage device 13 is disconnected.

In FIG. 8, when the controller 19 determines that the charging connector 31 is connected (Yes in Step St40), the controller 19 determines whether the lock device 15 locks the charging connector 31 (Step St44). The controller 19 receives a signal indicating the locked state or the unlocked state from the lock device 15. The lock device 15 transmits a signal indicating the unlocked state to the controller 19 when the pressing pin 41 is positioned above.

Further, when the lock device 15 determines that the drive unit 40 breaks down, the lock device 15 may transmit the signal indicating the unlocked state to the controller 19.

When the controller 19 determines the locked state where the lock device 15 locks the charging connector 31 (Yes in Step St44), the controller 19 sets the upper limit power value Plim3 to, for example, "∞" (Step St46). On the other hand, when the controller 19 determines that the charging connector 31 is in the unlocked state (No in Step St44), the controller 19 sets the upper limit power value Plim3 to Plim30 (Step St48). An upper limit power value Plim30 is smaller than the input upper limit power value Plim1 and the upper limit power value Plim2 in the normal state.

Returning to FIG. 7, the controller 18 requests the input upper limit power value Plim1 from the control device 20 (Step St16). When the control device 20 receives a request signal from the controller 18, the control device 20 transmits the input upper limit power value Plim1 (Step St18). The controller 18 transmits a request signal requesting a parameter including the upper limit power value Plim2 to the battery ECU 17 (Step St20). When the battery ECU 17 receives a request signal from the controller 18, the battery ECU 17 transmits information showing the upper limit power value Plim2 and the SOC of the power storage device 13 to the controller 18 (Step St22).

The controller 18 requests the upper limit power value Plim3 from the controller 19 (Step St24). When the controller 19 receives a request signal from the controller 18, the controller 19 transmits the upper limit power value Plim3 to the controller 18. (Step St26). The controller 18 sets the upper limit power value Plimf (Step St28). Specifically, the controller 18 sets the smallest value among the acquired input upper limit power value Plim1, upper limit power value Plim2, and upper limit power value Plim3 as the upper limit power value Plimf.

When the upper limit power value Plimf is set, the controller 18 transmits a charging parameter (Step St30). The charging parameter is information including at least one of the charging request Creq, the required power Preq, and the upper limit power value Plimf.

Figure 9:
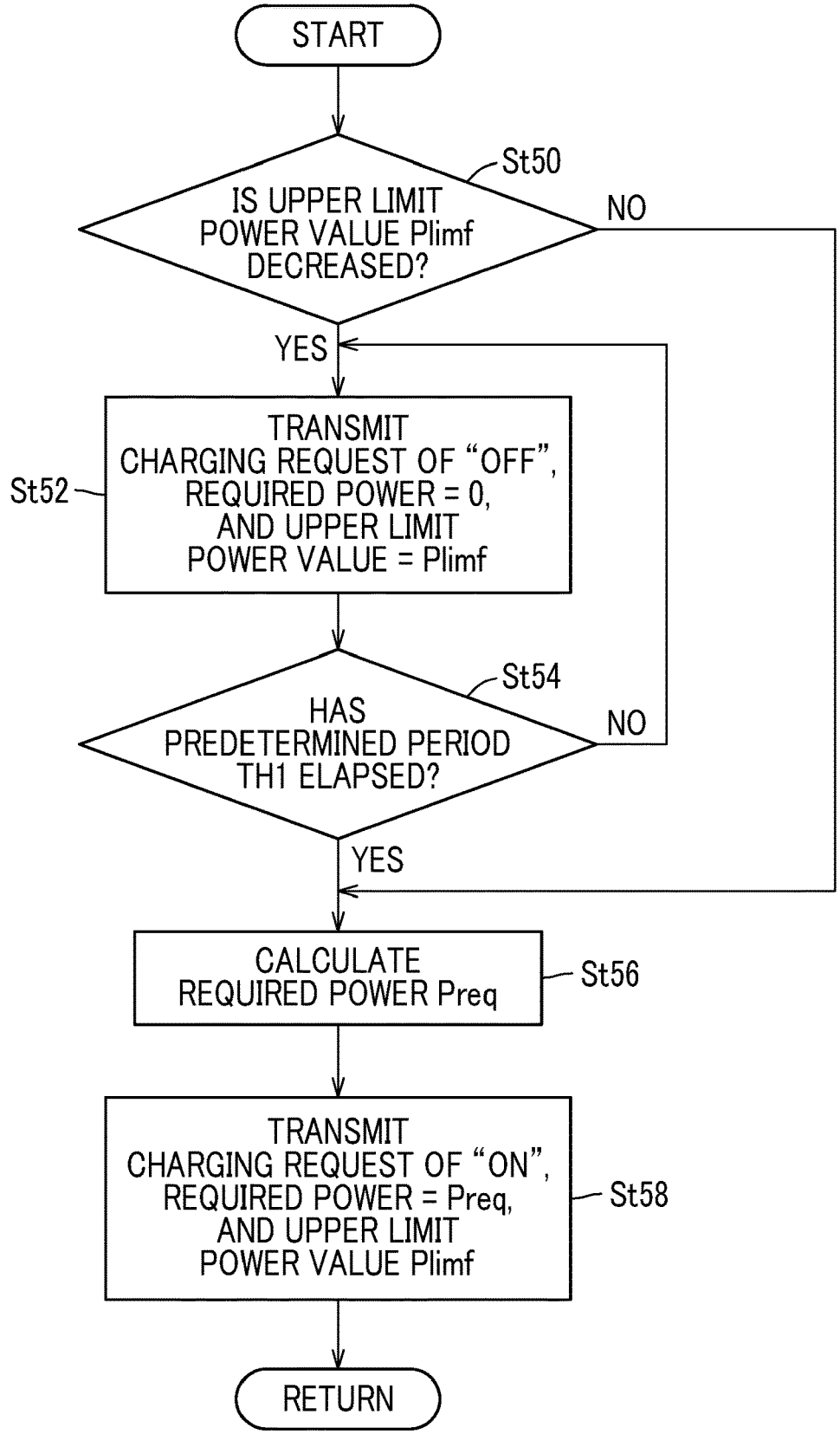
FIG. 9 is a flowchart showing steps of transmitting a charging parameter in detail.
Figure 10:
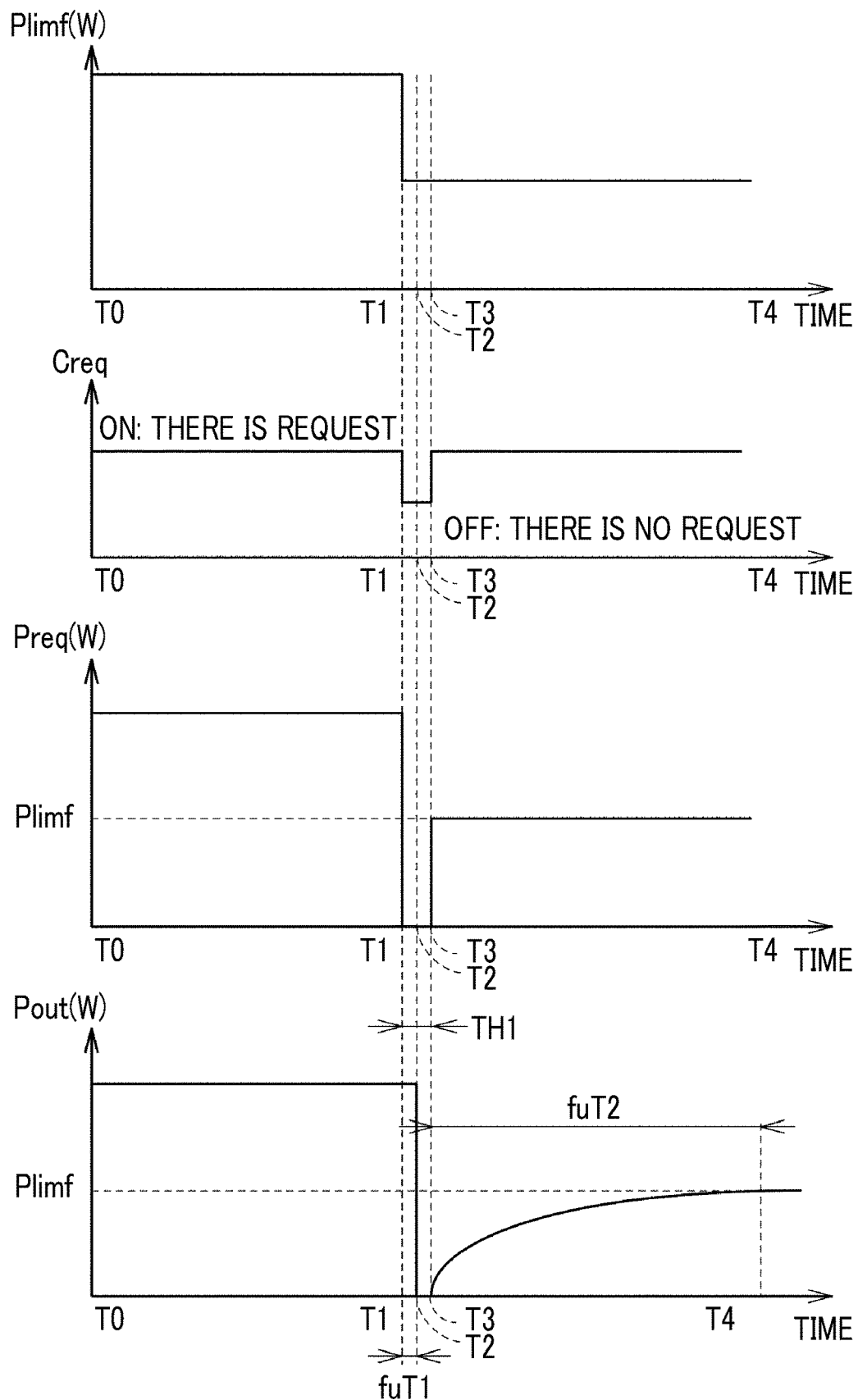
FIG. 10 is a state diagram showing an upper limit power value Plimf and a charging request Creq, and a required power Preq received by a charger 12 and an output power Pout output by the charger 12.

FIG. 9 is a flowchart showing steps of transmitting the charging parameter in detail. FIG. 10 is a state diagram showing the upper limit power value Plimf and the charging request Creq, and the required power Preq received by the charger 12 and the output power Pout output by the charger 12.

The controller 18 determines whether or not the upper limit power value Plimf is decreased (Step St50). Here, in Step St48 shown in FIG. 8, the upper limit power value Plim3 is set to "∞(W)" when the controller 19 determines that the charging connector 31 is locked by the lock device 15. As a result, in Step St28 shown in FIG. 7, the upper limit power value Plimf is set to the smaller one of the input upper limit power value Plim1 and the upper limit power value Plim2. In other words, when the input upper limit power value Plim1 and the upper limit power value Plim2 are not changed, the upper limit power value Plimf is not changed.

In such a case, in Step St50, the controller 18 determines that the upper limit power value Plimf is not changed (No in Step St50).

The required power Preq is calculated (Step St56). Specifically, the required power Preq is calculated based on the current SOC received from the battery ECU 17, the temperature of the power storage device 13, the rated current of the charging cable 30, the upper limit power value Plimf, or the like. Here, the required power Preq is set to be equal to or smaller than the upper limit power value Plimf.

The controller 18 transmits the calculated required power Preq, the charging request Creq of "ON", and the upper limit power value Plimf to the charger 12 (Step St58).

For example, in FIG. 10, from time T0 to time T1, the upper limit power value Plimf, the required power Preq, and the output power Pout are maintained constant, and the charging request Creq is maintained "ON".

In Step St48 shown in FIG. 8, when "Plim30" is set as the upper limit power value Plim3, the upper limit power value Plimf becomes "Plim30", and the upper limit power value Plimf becomes smaller. Note that, Plim30 is set to a value much smaller than the normal input upper limit power value Plim1 and upper limit power value Plim2. Note that, the normal input upper limit power value Plim1 is an input upper limit power value that is set in a state where the required power from the home electric appliance is smaller than a predetermined electric power. Further, the normal upper limit power value Plim2 is an upper limit power value that is set when, for example, the temperature of the power storage device 13 is lower than the threshold temperature and the SOC is lower than 80%, for example.

Then, in FIG. 9, when the controller 18 determines that the upper limit power value Plimf is decreased (Yes in Step St50), the controller 18 transmits the charging request Creq of "OFF" to the charger 12. The controller 18 transmits "0 (W)" as the required power Preq. The controller 18 transmits the upper limit power value Plimf. When the charger 12 receives the charging parameter (including the charging request Creq, the required power Preq, and the upper limit power value Plimf) from the controller 18, the charger 12 stops driving. As a result, the output power Pout output from the charger 12 to the power storage device 13 becomes "0 (W)".

Here, the time from when the charger 12 receives the charging parameter from the controller 18 until the output power Pout becomes "0 (W)" is defined as follow-up time fuT1.

The controller 18 continuously transmits the charging request Creq of "OFF", the required power Preq of "0 (W)", and the upper limit power value Plimf until predetermined period TH1 elapses (Step St54). Here, predetermined period TH1 is a time longer than follow-up time fuT1.

In FIG. 10, at time T1, the upper limit power value Plimf is decreased, the charging request Creq is "OFF", and the required power Preq is "0 (W)".

Also, at time T2 when follow-up time fuT1 has elapsed from time T1, the output power Pout is "0 (W)". Here, when the charging request Creq is "OFF" and the required power Preq is "0 (W)", the charger 12 is not performing feedback control. Therefore, follow-up time fuT1 is a short time.

At time T2, since predetermined period TH1 has not elapsed from time T1, the charging request Creq is "OFF" and the required power Preq is "0 (W)".

Returning to FIG. 9, when the controller 18 determines that predetermined period TH1 has elapsed (Yes in Step St54), the controller 18 calculates the required power Preq (Step St56). Specifically, the required power Preq is calculated based on the current SOC received from the battery ECU 17, the temperature of the power storage device 13, the rated current of the charging cable 30, the upper limit power value Plimf, or the like. Here, the required power Preq is set to be equal to or smaller than the upper limit power value Plimf.

The controller 18 transmits the calculated required power Preq, the charging request Creq of "ON", and the upper limit power value Plimf to the charger 12 (Step St58).

In FIG. 10, time T3 is a time when predetermined period TH1 has elapsed from time T1. At time T3, the charging request Creq is "ON" and the required power Preq is changed. Here, after time T3, the required power Preq is decreased as the upper limit power value Plimf is decreased. In an example shown in FIG. 10, after time T3, the required power Preq is the same as the upper limit power value Plimf.

Although details will be described later, in the example shown in FIG. 10, the upper limit power value Plimf and the required power Preq are maintained in a decreased state even after time T3. The output power Pout gradually increases from time T3, and the output power Pout matches the required power Preq at time T4 when follow-up time fuT2 has elapsed from time T3.

Here, at time T3, the charger 12 adjusts the output power Pout while performing the feedback control when bringing the output power Pout closer to the required power Preq. As the feedback control, for example, Proportional-Integral-Differential Controller (PID) control or the like can be adopted.

For example, when follow-up time fuT2 is shortened to the same extent as follow-up time fuT1, the output power Pout may be larger than the required power Preq, and the output power Pout may be larger than the upper limit power value Plimf (overshoot).

In a case where the output power Pout is adjusted to be small, when follow-up time fuT2 is short, the output power Pout may be too small with respect to the required power Preq (undershoot).

As described above, when follow-up time fuT2 is shortened, a time needed to match the output power Pout with the required power Preq becomes longer. As a result, a charging efficiency may be decreased. Therefore, follow-up time fuT2 is set to be longer than follow-up time fuT1. That is, a rate of change at which the charger 12 changes the output power Pout when the controller 18 stops charging is higher than a rate of change at which the charger 12 changes the output power Pout such that the output power Pout approaches the required power Preq received from the controller 18. As described above, follow-up time fuT1 is shorter than follow-up time fuT2. In the charging system 1, when it is found that the charging connector 31 is in the unlocked state, the output power Pout can be suppressed to be small in a short time.

When the controller 18 finishes Step St58 shown in FIG. 9, the controller 18 finishes Step St30 shown in FIG. 7. After that, the controller 18 determines whether the charging is completed as shown in FIG. 6 (Step St3). Specifically, when the controller 18 determines that the current SOC acquired from the battery ECU 17 is, for example, fully charged, the controller 18 stops charging (Step St4). When stopping charging, the controller 18 transmits the charging request Creq of "OFF" and the required power Preq of "0 (W)" to the charger 12. Thereby, the charger 12 stops driving. When the charging relay is provided between the charger 12 and the power storage device 13, the controller 18 turns off the charging relay.

Second Embodiment

A charging system according to a second embodiment will be described mainly with reference to FIGS. 11 to 13. Since a configuration of the charging system according to the second embodiment and a configuration of the charging system 1 according to the first embodiment are substantially the same, the description will be made with reference to FIG. 1 or the like as appropriate.

In the charging system according to the second embodiment, the control during charging (Step St2) shown in FIG. 6 is different from that in the first embodiment.

Figure 11:
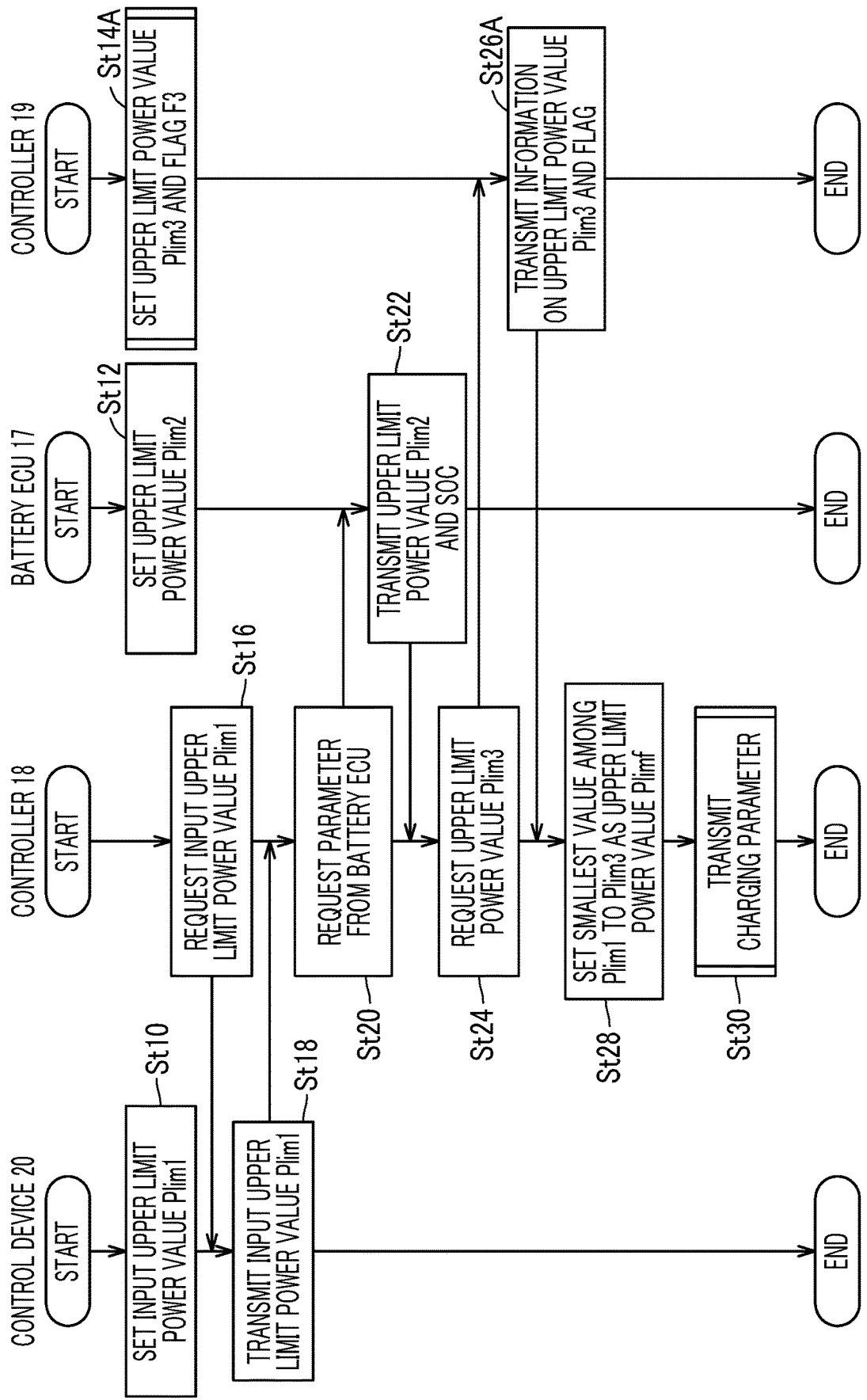
FIG. 11 is a flowchart showing a control during charging in a second embodiment.

FIG. 11 is a flowchart showing the control during charging in the second embodiment. In FIG. 11, the controller 19 sets the upper limit power value Plim3 and a flag F3 (Step St14A). FIG. 12 is a flowchart showing Step St14A.

Figure 12:
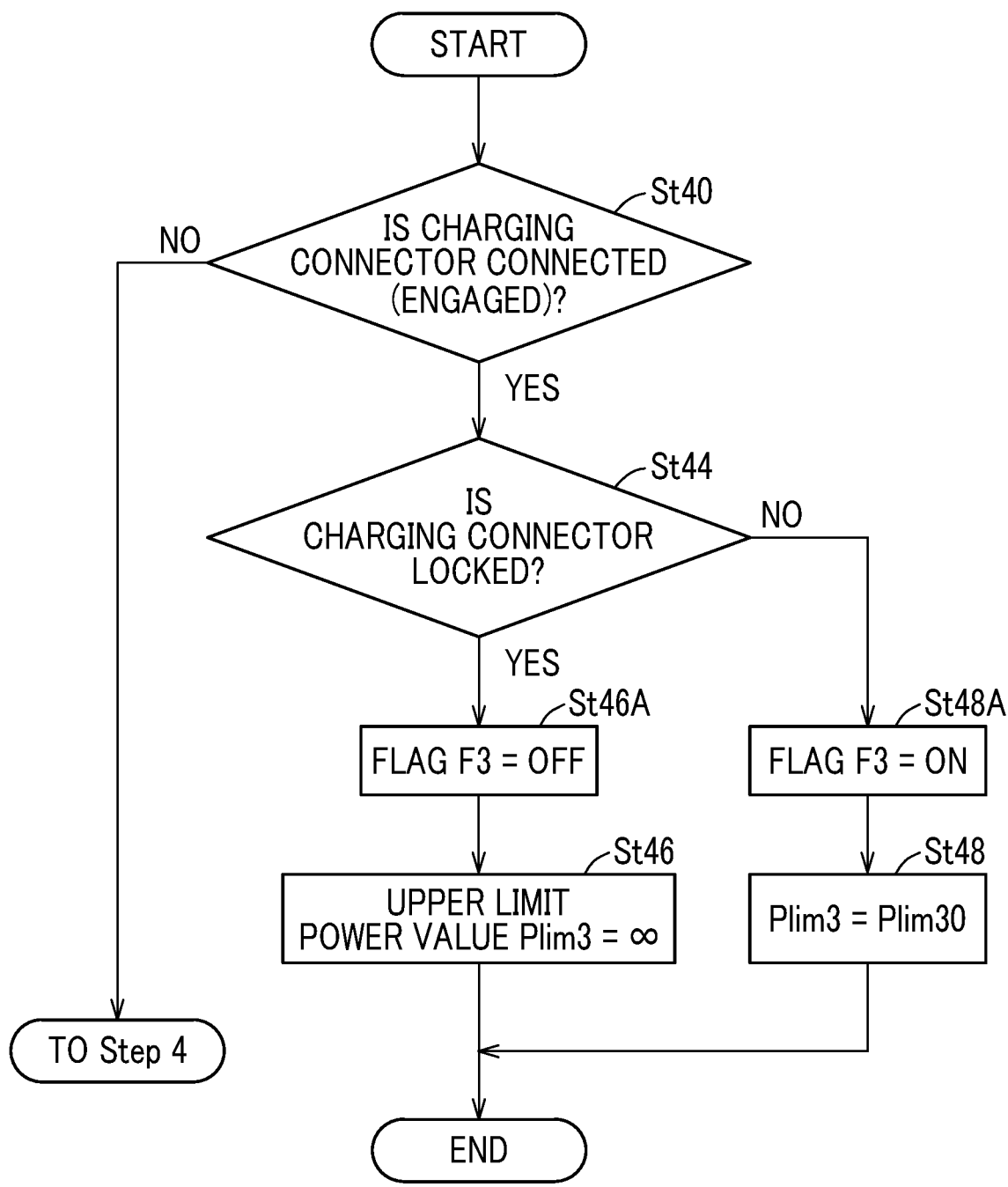
FIG. 12 is a flowchart showing Step St14A.

As shown in FIG. 12, when the controller 19 determines that the charging connector 31 is in the locked state (Yes in Step St44), the flag F3 is turned to "OFF" (Step St46A). Then, the upper limit power value Plim3 is set to "∞(W)" (Step St46).

On the other hand, when the controller 19 determines that the charging connector 31 is in the unlocked state (No in Step St44), the flag F3 is turned to "ON" (Step St48A). Then, the upper limit power value Plim3 is set to "Plim30" (Step St48).

Returning to FIG. 11, when the controller 19 receives the request signal from the controller 18 (Step St24), the controller 19 transmits information on the upper limit power value Plim3 and the flag F3 to the controller 18 (Step St26A).

Therefore, when the charging connector 31 is in the locked state, the information showing that the upper limit power value Plim3 is "∞(W)" and the flag F3 is "OFF" is transmitted. When the charging connector 31 is in the unlocked state, the information showing that the upper limit power value Plim3 is "Plim30" and the flag F3 is "ON" is transmitted.

The controller 18 sets the upper limit power value Plimf (Step St28). Then, the controller 18 sets the charging parameter (Step St30A).

Figure 13:
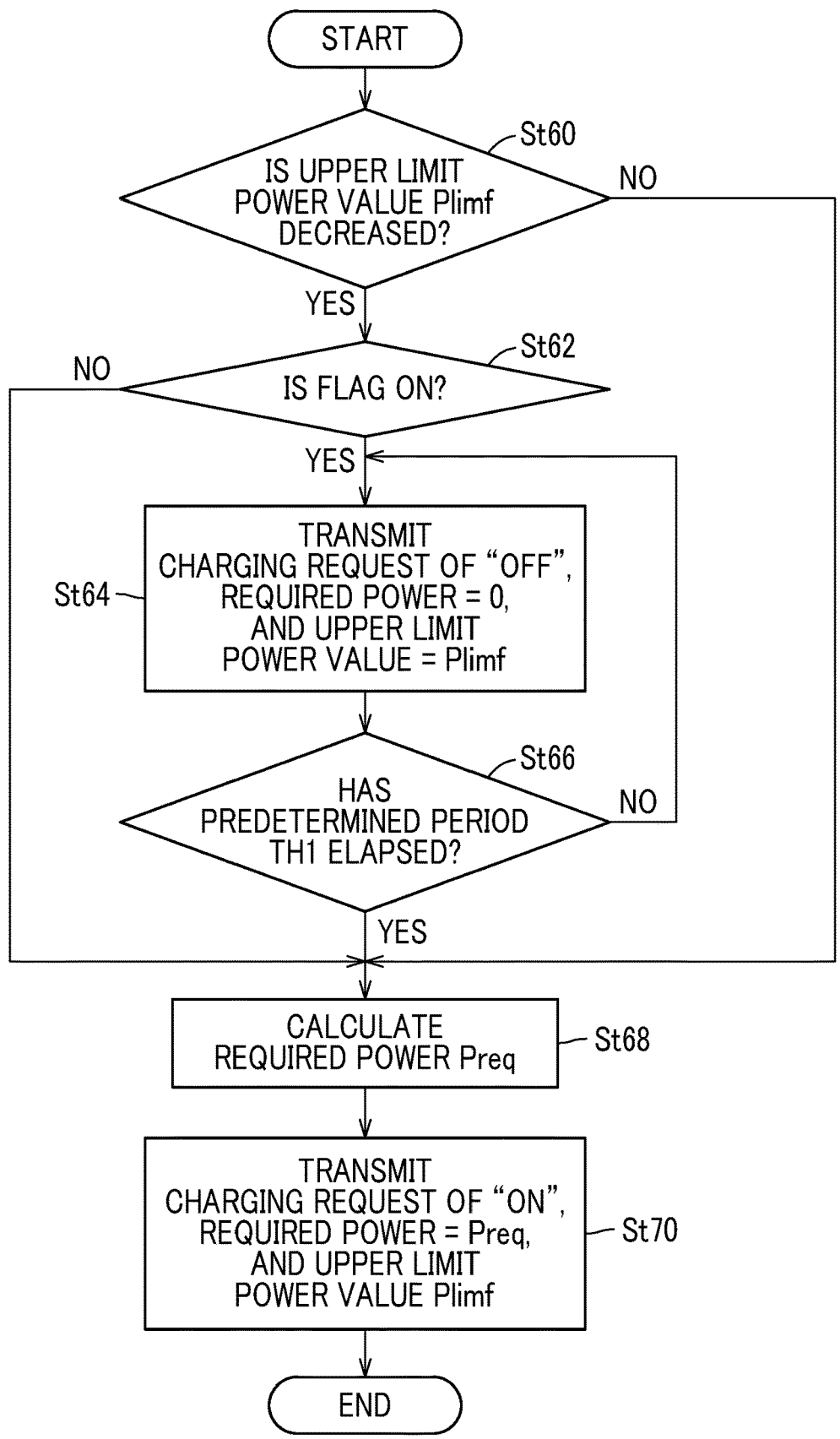
FIG. 13 is a flowchart showing Step St30A.

FIG. 13 is a flowchart showing Step St30A. The controller 18 determines whether or not the upper limit power value Plimf is decreased (Step St60). When the controller 18 determines that the upper limit power value Plimf is decreased (Yes in Step St60), the controller 18 determines whether or not the flag F3 is ON (Step St62).

When the flag F3 is "ON" (Yes in Step St62), the controller 18 transmits the charging request Creq of "OFF" to the charger 12. The controller 18 transmits "0 (W)" as the required power Preq. The controller 18 transmits the upper limit power value Plimf (Step St64). When the charger 12 receives the charging parameter (including the charging request Creq, the required power Preq, and the upper limit power value Plimf) from the controller 18, the charger 12 stops driving. As a result, the output power Pout output from the charger 12 to the power storage device 13 becomes "0 (W)".

The controller 18 continuously transmits the charging request Creq of "OFF", the required power Preq of "0 (W)", and the upper limit power value Plimf until predetermined period TH1 elapses (Step St66).

Then, when the controller 18 determines that predetermined period TH1 has elapsed (Yes in Step St66), the controller 18 calculates the required power Preq (Step St68). The controller 18 transmits the calculated required power Preq, the charging request Creq of "ON", and the upper limit power value Plimf to the charger 12 (Step St70).

On the other hand, in Step St60, when the controller 18 determines that the upper limit power value Plimf is not decreased (No in Step St60), the controller 18 calculates the required power Preq (Step St68). Also, the controller 18 transmits the calculated required power Preq, the charging request Creq of "ON", and the upper limit power value Plimf to the charger 12 (Step St70).

Similarly, in Step St62, when the controller 18 determines that the flag F3 is "OFF" (No in Step St62), the controller 18 calculates the required power Preq (Step St68). Also, the controller 18 transmits the calculated required power Preq, the charging request Creq of "ON", and the upper limit power value Plimf to the charger 12 (Step St70).

As described above, in the present embodiment, even in a case where the upper limit power value Plim3 is decreased, the required power Preq is "0 (W)" and the charging request Creq is set to "OFF" solely when the flag F3 is ON (the charging connector 31 is in the unlocked state).

Therefore, charging is temporarily stopped solely when there is a need to stop charging immediately as in a case where the charging connector 31 is in the unlocked state.

On the other hand, there are various causes for a case where the upper limit power value Plimf is decreased. For example, there may be a case where the input upper limit power value Plim1 is decreased as a result of an increase in the required power from the home electric appliance. Even in such a case, it is not urgent. Therefore, in the charging system according to the second embodiment, charging is continuously performed without stopping charging.

It should be considered that the embodiments disclosed here are merely examples in all points and not restrictive. The scope of the present disclosure is defined by the terms of the claims, and is intended to include meanings equivalent to the terms of the claims and any modifications within the scope.

What is claimed is:

1. A vehicle comprising:
   an inlet configured to be connected to a charging connector provided in a charging station;
   a lock device configured to switch between a locked state in which the charging connector is locked to the inlet and an unlocked state in which the charging connector is removable from the inlet;
   a power storage device configured to be charged with an electric power supplied to the inlet through the charging connector; and
   a controller configured to control charging of the power storage device,
   wherein in a state in which the charging connector is connected to the inlet and the power storage device is being charged, the controller stops the charging of the power storage device after determining that the lock device is in the unlocked state.

2. The vehicle according to claim 1, further comprising a charger configured to receive an input power supplied to the inlet through the charging connector and output an output power to the power storage device by adjusting the received input power, wherein:
   the charger performs feedback control of the output power such that the output power approaches a required power received from the controller; and
   the charger does not perform the feedback control when the charging of the power storage device is stopped.

3. The vehicle according to claim 1, further comprising a charger configured to receive an input power supplied to the inlet through the charging connector and output an output power to the power storage device by adjusting the received input power, wherein:
   the charger is driven such that the output power becomes a required power received from the controller; and
   a rate of change at which the charger changes the output power when the controller stops the charging of the power storage device is higher than a rate of change at which the charger changes the output power such that the output power becomes the required power.

4. The vehicle according to claim 1, wherein the controller stops the charging of the power storage device when the lock device is in the unlocked state, and restarts the charging of the power storage device after a predetermined period has elapsed from the stop of the charging of the power storage device while the lock device remains in the unlocked state.

5. The vehicle according to claim 4, wherein a first charging power when the charging of the power storage device is restarted is smaller than a second charging power before the charging of the power storage device is stopped.

6. The vehicle according to claim 1, wherein in the state in which the charging connector is connected to the inlet and the power storage device is being charged, the controller stops the charging of the power storage device after determining that the lock device is in the unlocked state while the controller continues to receive a connector signal indicating that the charging connector is connected to the inlet.

7. A charging system comprising:
   a charging station provided with a charging connector; and
   a vehicle, wherein:
   the vehicle includes
      an inlet to which the charging connector is configured to be connected,
      a cable lock device configured to switch between a locked state in which the charging connector connected to the inlet is locked to the inlet and an unlocked state in which the charging connector connected to the inlet is removable from the inlet,
      a power storage device configured to be charged with an electric power supplied to the inlet through the charging connector, and
      a controller configured to control charging of the power storage device,
      wherein in a state where in which the charging connector is connected to the inlet and the power storage device is being charged, the controller stops the charging of the power storage device after determining that the cable lock device is in the unlocked state.

8. The charging system according to claim 7, wherein in the state in which the charging connector is connected to the inlet and the power storage device is being charged, the controller stops the charging of the power storage device after determining that the cable lock device is in the unlocked state while the controller continues to receive a connector signal indicating that the charging connector is connected to the inlet.

* * * * *